(12) United States Patent  (10) Patent No.: US 7,689,244 B2
Kim  (45) Date of Patent: Mar. 30, 2010

(54) MOBILE COMMUNICATION TERMINAL

(75) Inventor: Jung Ha Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 11/242,997

(22) Filed: Oct. 4, 2005

(65) Prior Publication Data

US 2006/0084465 A1    Apr. 20, 2006

(30) Foreign Application Priority Data

Oct. 4, 2004    (KR) ...................... 10-2004-0078703

(51) Int. Cl.
*H04M 1/00* (2006.01)
*H04B 1/034* (2006.01)
(52) U.S. Cl. ................. 455/550.1; 455/90.3; 455/575.1
(58) Field of Classification Search ............. 455/550.1, 455/556.1, 575.3, 41.3, 90, 575.7, 90.1, 90.3, 455/575.1
See application file for complete search history.

(56) References Cited

U.S. PATENT DOCUMENTS

| 6,708,046 | B1 * | 3/2004 | Takagi | ...................... 455/575.3 |
| 7,184,808 | B2 * | 2/2007 | Shoji | ......................... 455/575.7 |
| 7,210,629 | B2 * | 5/2007 | Cho et al. | ..................... 235/454 |
| 2001/0051510 | A1 * | 12/2001 | Nakamura | .................... 455/90 |
| 2003/0107549 | A1 | 6/2003 | Lu | |
| 2003/0194975 | A1 | 10/2003 | Nishiyama et al. | |
| 2003/0223610 | A1 | 12/2003 | Tanemura et al. | |
| 2004/0023684 | A1 * | 2/2004 | Sato et al. | ................. 455/550.1 |
| 2004/0072589 | A1 | 4/2004 | Hamamura et al. | |
| 2004/0198417 | A1 * | 10/2004 | Yoda | ........................ 455/550.1 |
| 2004/0266477 | A1 * | 12/2004 | Murata | ..................... 455/556.1 |
| 2005/0003761 | A1 * | 1/2005 | Chandley | .................... 455/41.3 |
| 2005/0153729 | A1 * | 7/2005 | Logan et al. | .............. 455/550.1 |
| 2005/0277435 | A1 * | 12/2005 | Park et al. | ................. 455/550.1 |

FOREIGN PATENT DOCUMENTS

| CN | 1260575 | A | 7/2000 |
| CN | 1418360 | | 5/2003 |
| CN | 1501740 | A | 6/2004 |
| CN | 1509046 | A | 6/2004 |
| EP | 1 408 673 | A | 4/2004 |
| EP | 1 420 567 | A | 5/2004 |
| EP | 1 420 567 | A2 | 5/2004 |
| GB | 2 394 381 | A | 4/2004 |
| JP | 2002-016675 | | 1/2002 |

(Continued)

*Primary Examiner*—Melody Mehrpour
(74) *Attorney, Agent, or Firm*—Lee, Hong, Degerman, Kang & Waimey

(57) ABSTRACT

A mobile communication terminal with dedicated keys for controlling an integrated functional component such as an audio player, in which the dedicated keys are situated at convenient positions for use. The mobile communication terminal includes a housing that accommodates parts which enable wireless communications with an external device and has an audio player therein. The terminal includes a control key assembly positioned on at least one lateral side of the housing to enable a user to operate the audio player. The position of the control key assembly assists the user in pressing the keys using his thumb, forefinger, middle finger and third finger. The position of the control key assembly also enables a wide auxiliary display to be positioned on the upper surface of the housing, e.g., on the outer surface of the upper housing.

28 Claims, 12 Drawing Sheets

FOREIGN PATENT DOCUMENTS

| | | |
|---|---|---|
| JP | 2002057756 | 2/2002 |
| JP | 2002-354084 | 12/2002 |
| JP | 2003-198696 | 7/2003 |
| JP | 2004-108581 | 4/2004 |
| JP | 2004128909 | 4/2004 |
| JP | 2004128910 | 4/2004 |
| JP | 2004-274594 | 9/2004 |
| KR | 2004 0042477 A | 5/2004 |
| WO | WO 2004-075428 A | 9/2004 |

* cited by examiner

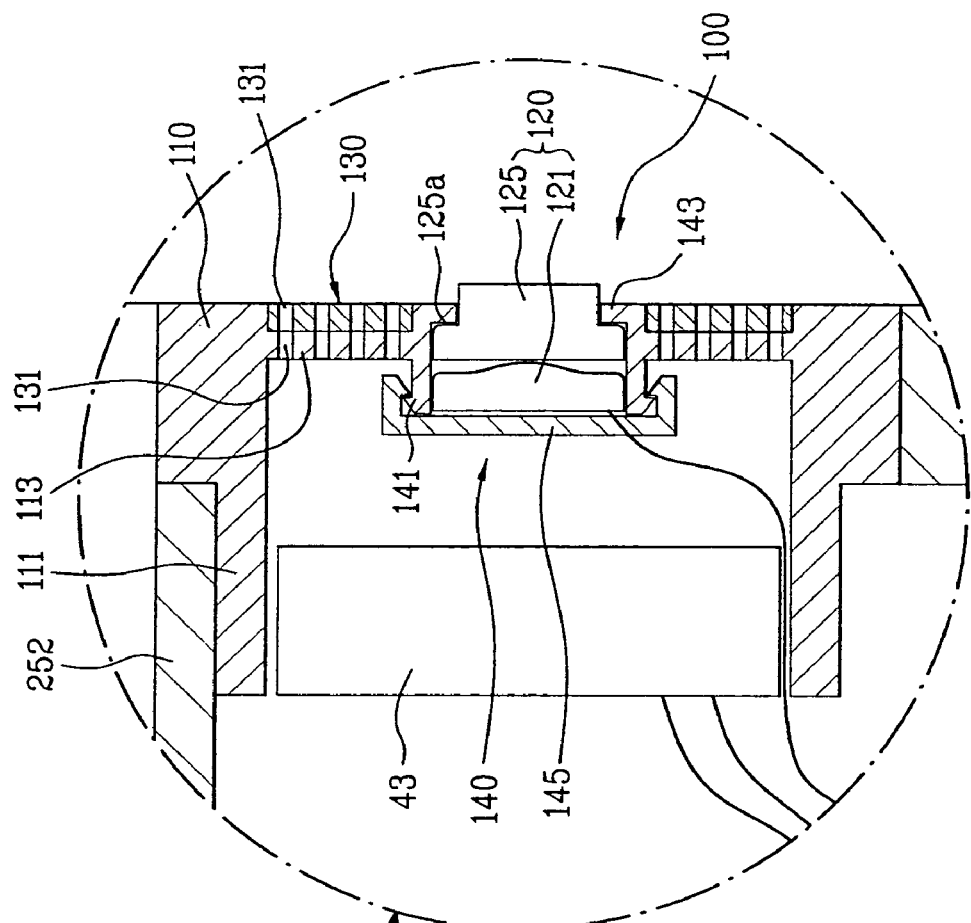
FIG. 4A
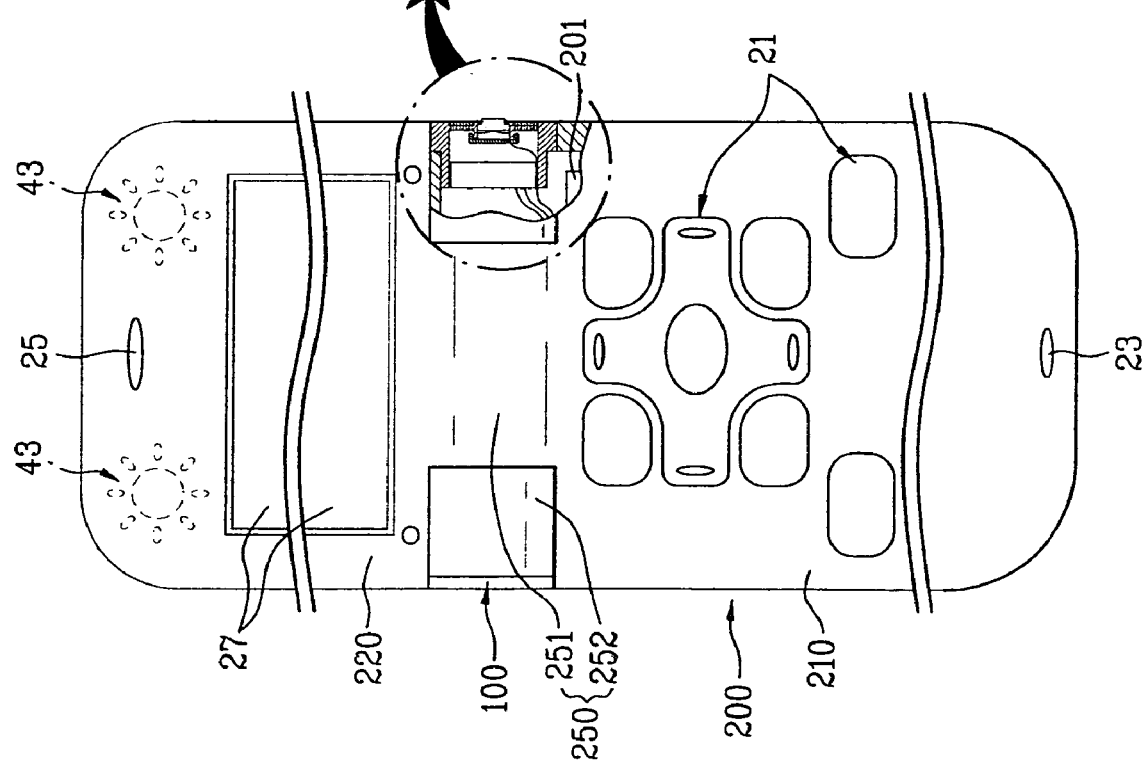

MOBILE COMMUNICATION TERMINAL

This application claims the benefit of the Korean Application No. 10-2004-0078703 filed on Oct. 4, 2004, which is hereby incorporated herein by reference.

BACKGROUND OF THE INVENTION

1. Field of the Invention

The present invention relates to a mobile communication terminal, and more particularly, to a mobile communication terminal provided with dedicated control keys that are positioned so as to be conveniently accessed and easy to use for controlling the operation of a functional component integrated in the mobile terminal, such as an audio player.

2. Discussion of the Related Art

Originally, mobile communication devices such as mobile phones, personal digital assistants (PDAs) and the like were dedicated to one or two functions, such as wireless voice communications. However, as technology has advanced, so have the relative capabilities of these devices. For example, such mobile communications devices incorporate increasingly sophisticated technologies and, as a result, provide additional functions. For example, wireless mobile telephones now typically include features such as digital displays for displaying character and image information, gaming functions and the like in addition to simple voice capabilities. Integration of functional components continues. For example, mobile communication terminals, such as the type shown in FIG. 1, are now commonly offered with features such as an audio player function for playing back audio files, and a digital camera function for capturing digital photos and videos.

While users continue to demand this type of increased functionality, there is an ongoing effort to insure that the devices are provided within smaller and smaller form factors. The ability to provide additional functionality along with a small form factor has, however, created problems with respect to usability of these devices. In particular, small sizes and increased functions can result in a device that is more difficult to use and control on the part of a user. For example, in a device having an integrated camera and audio player function, the need to position a camera lens as well as control keys for operating and controlling the audio player can be problematic—especially in a device having a small form factor. The device shown in FIG. 1 is illustrative of this particular problem.

FIG. 1 illustrates a typical mobile communication terminal in the form of a mobile telephone having an integrated digital camera and audio player. In this type of environment, a camera lens 4, is generally positioned at the top end of an upper housing 1. Alternatively, the lens 4 might be positioned on a hinge 7 joining the upper housing to a lower housing 2, or on a rear side of the lower housing 2. Typically, control keys 6, such as those shown in FIG. 1, are provided for controlling the audio player and are positioned on an outer surface of the upper housing 1.

In addition to the control keys and the lens, an auxiliary display 5, as shown in FIG. 1, is typically positioned along a portion of the upper housing 1 so that a user can check a current time, caller information and the like without opening the upper housing 1. As will be appreciated, the need to provide all of these functional components—the lens 4, the control keys 6 and the auxiliary display 5—within the relatively small space provided by the front surface of the upper housing 1 is difficult. For example, this arrangement inevitably limits the size of the auxiliary display 5 that can be provided, or may limit the size and type of control keys 6 that might otherwise be provided, thereby limiting the usability of the mobile communication terminal.

Previous solutions to this problem have not been completely satisfactory. For example, in designing the terminal to increase the size of the auxiliary display 5, the lens 4 might be positioned on the hinge 7, or on the lower housing 2. Or, the control keys 6 might be positioned on the main keypad (such as might be found on a typical mobile telephone, not shown in the drawing) that is provided on the lower housing 2 and accessible only when the mobile device is placed in an open position. However, these approaches are not entirely satisfactory because they all result in a device that is less convenient to use. For example, when the control keys 6 are positioned in the keypad disposed on the lower housing 2, it requires the user to first open the mobile communication terminal to use the audio player. This typically requires the use of two hands, and can be inconvenient.

Moreover, if the control keys 6 are situated at the positions shown in FIG. 1, it is difficult for a user holding the mobile communication terminal by one hand to press or otherwise manipulate the appropriate control key 6. In this case, a user usually presses the control keys 6 using the thumb of the hand that holds the mobile communication terminal. This type of operation is normally difficult and inconvenient. Hence, a user needs to use both hands to press the control keys 6 correctly—again, an operation that can be very inconvenient.

Thus, in view of the above problems it would be desirable to provide a mobile communication device, such as a cellular telephone, PDA or the like having integrated functions such as an audio player, with accessible and easy to use control keys.

SUMMARY OF THE INVENTION

The present invention is directed to a mobile communication terminal that substantially obviates one or more problems due to limitations and disadvantages of the related art.

An object of the present invention is to provide a mobile communication terminal having one or more control keys for controlling a functional component integrated with the mobile communication terminal, such as an integrated audio player. Preferably, the control keys are situated on the mobile terminal so as to be convenient and easy to manipulate by a user of the device.

Another object of the present invention is to provide a mobile communication terminal with the easy to use control key function, and yet do so in a manner that permits the implementation of a larger auxiliary display positioned on an exterior of the mobile communication terminal. The larger auxiliary display allows for more convenient operation and monitoring of the mobile terminal by a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal, such as a wireless telephone, is provided. In example embodiments, the device is disposed within a foldable, clamshell-like housing that includes an upper housing portion and a lower housing portion, which are rotatably connected via a hinge mechanism. In preferred embodiments, the mobile communication terminal also includes additional functional components integrated within the device, such as an audio or video player, a digital camera and the like. Also included is a control key assembly that provides at least one control key for operating the integrated functional component. For example, in a preferred embodiment, the control key assembly is conveniently positioned on at least one lateral side of the housing of the mobile device and situated so as to allow easy access by a user to operate the audio player.

In a preferred embodiment, the mobile communication terminal further includes an auxiliary display positioned on an outer surface of the upper housing portion, such that the display is visible to a user when the mobile device is folded about the hinge in a closed position. The display can be used for showing any information pertinent to the mobile communication device. In the case of a mobile telephone, the information might include incoming call information, current date and time, and the like. The auxiliary display could also be used to display information pertinent to the integrated functional component, such as status or volume information for an audio player.

As noted above, in preferred embodiments, the mobile terminal device has a clamshell-like design, where upper and lower housing portions are joined by a hinge assembly. In illustrated embodiments, the hinge assembly includes a central portion having end portions. To maximize space as well as enhancing accessibility, the control key assembly is formed on one or both of the end portions. The control keys are mechanically and electrically interfaced with circuitry internal to the housing so as to permit control of a function of the mobile terminal device, such as an integrated audio player. For example, manipulation of the control keys might control the "play" or "stop" function of the audio player. Providing the keys in the hinge assembly provides an efficient use of physical space, and also ensures easy, one handed operation by the user. Importantly, the user can manipulate the operation of the audio player (or other integrated function) without having to "open" the mobile terminal.

In yet a further embodiment, a speaker is also provided within each of the end portions of the hinge assembly. In this way, an audio player may utilize the speakers for the playback of audio. In this embodiment, the control keys are implemented so as to be functionally integrated with the speaker structure. This approach provides the additional audio function, and yet does so in a manner that utilizes minimal physical space. Again, this approach maximizes the space available to, for example, the auxiliary display, which can now be a larger size.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4A is a diagram of a control key assembly of an audio assembly and speaker joined to a hinge in the mobile communication terminal in FIG. 3A and FIG. 3B;

DETAILED DESCRIPTION OF EXAMPLE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
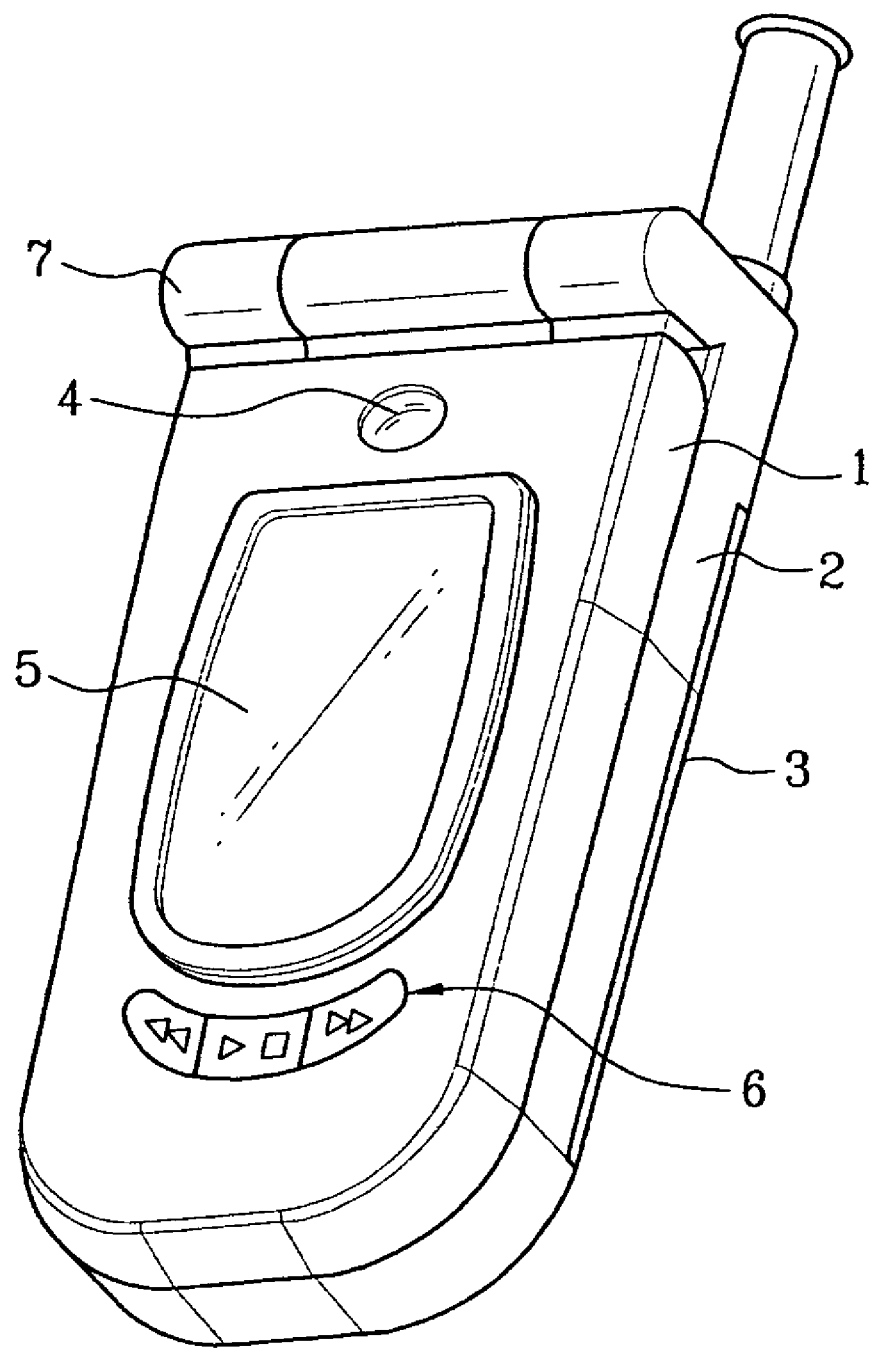
FIG. 1 is a perspective diagram of a mobile communication terminal according to a related art.
Figure 2:
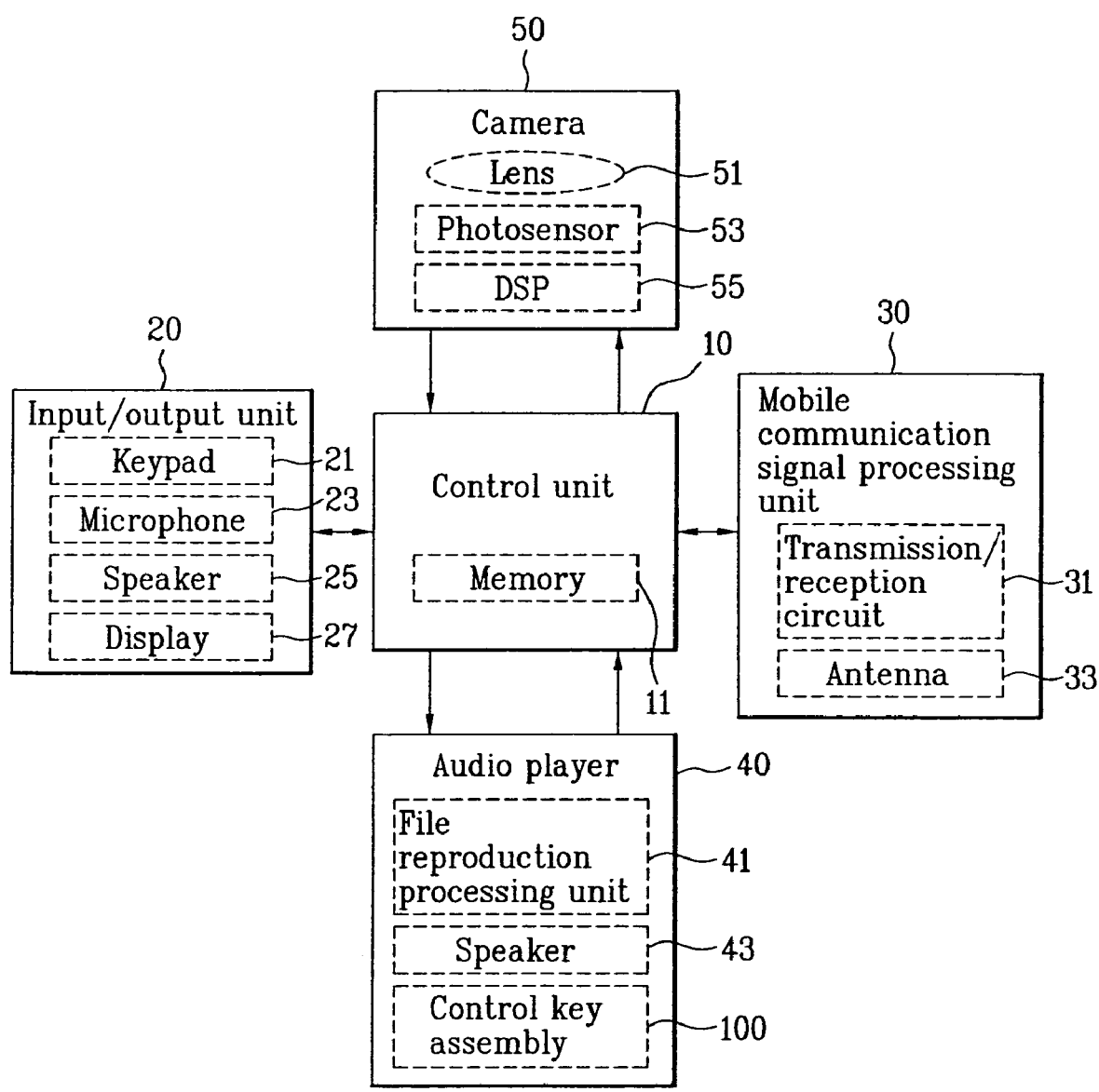
FIG. 2 is a block diagram of a mobile communication terminal according to the present invention.

FIG. 2 is a block diagram of a mobile communication terminal according to an example of a preferred embodiment of the present invention. For purposes of illustration, the mobile communication terminal is shown herein as comprising a mobile telephone. However, it will be appreciated that the invention is not limited to such an environment, and can be implemented in any one of a number of different environments, including but not limited to personal digital assistants (PDAs) and similar handheld computing or communication devices. Referring to FIG. 2, a mobile communication terminal according to an example embodiment includes a control unit 10, an input/output unit 20, a mobile communication processing unit 30 for enabling wireless communications with an external device, a digital camera functional component 50 capable of capturing digital images, and an audio player 40 for playing audio files. The above mentioned parts are built in or on a housing 200 (illustrated in FIG. 3A).

In this example embodiment, the input/output unit 20 includes a keypad 21 that can be activated by a user to operate the mobile terminal, a microphone 23 capable of receiving a voice input, a speaker 25 for outputting audio, and a display 27 for displaying textual or graphical information.

The mobile communication signal processing unit 30 can include, for example, a transmission/reception circuit 31 and an antenna 33 for outputting a wireless signal processed by the transmission/reception circuit 31 or receiving an external wireless signal. In addition, the transmission/reception circuit 31 includes a transmission signal processing unit and a reception signal processing unit (not shown in the drawing). The transmission signal processing unit is generally configured to cause the wireless transmission of a signal such as information inputted via the input/output unit 20 (e.g., the voice of a user) or information stored in a memory 11 of the control unit 10. The reception signal processing unit is configured for receiving and processing external wireless signals received by the mobile communication terminal. In general, the mobile communication signal processing unit 30 allows the mobile communication terminal to wirelessly communicate with an external device, e.g., a base station.

As is further depicted in FIG. 2, the audio player component 40 is configured to output an audio file that is stored within a memory location, such as the memory 11 of the control unit 10. For example, the audio player 40 might be configured to output an audio file stored in the MP3 file format. For this, the audio player includes a file reproduction processing unit 41 configured for processing the audio file, a speaker 43 capable of outputting the audio signal, and a control key assembly 100 that provides a user with the ability to control the functionality of audio player 40, such as volume, playback, audio file selection, and the like.

It will be appreciated that the speaker 25 of the input/output unit 20 could be used as the audio player speaker 43. However, the speaker 43 of the audio player 40 is preferably separate from the speaker 25 of the input-output unit 20 to provide a better quality of sound. The speaker 43 can be provided as an integrated and discrete speaker, or an audio output component for supplying the audio signal to headphones or other external speaker system, or both. Likewise, the keypad 21 of the input/output unit 20 could be used to provide the functionality of the audio player control key assembly 100. Preferably, the control key assembly 100 is separate from the main keypad 21 to provide the user with the ability to conveniently operate and control the audio player 40 functions.

As is further shown in FIG. 2, a camera 50 can also be provided as an integrated functional component of the mobile communication terminal. In the example embodiment, the camera 50 includes a lens 51, a photo-sensor 53 for converting light through the lens to an analog signal, and a DSP (digital signal processor) 55 for converting the analog signal to a digital signal.

Configurations of the above-described control unit 10, input/output unit 20, mobile communication signal processing unit 30, audio player 40 and camera 50 are similar to those of a conventional mobile communication terminal. Such devices are well known in the art and thus not described further However; the mobile communication terminal according to the present invention differs from a conventional mobile communication terminal in that the control key assembly 100 for controlling the audio player 40 is positioned so as to be more accessible and easy to use for the user. Examples of this improved configuration are described below.

Figure 3A:
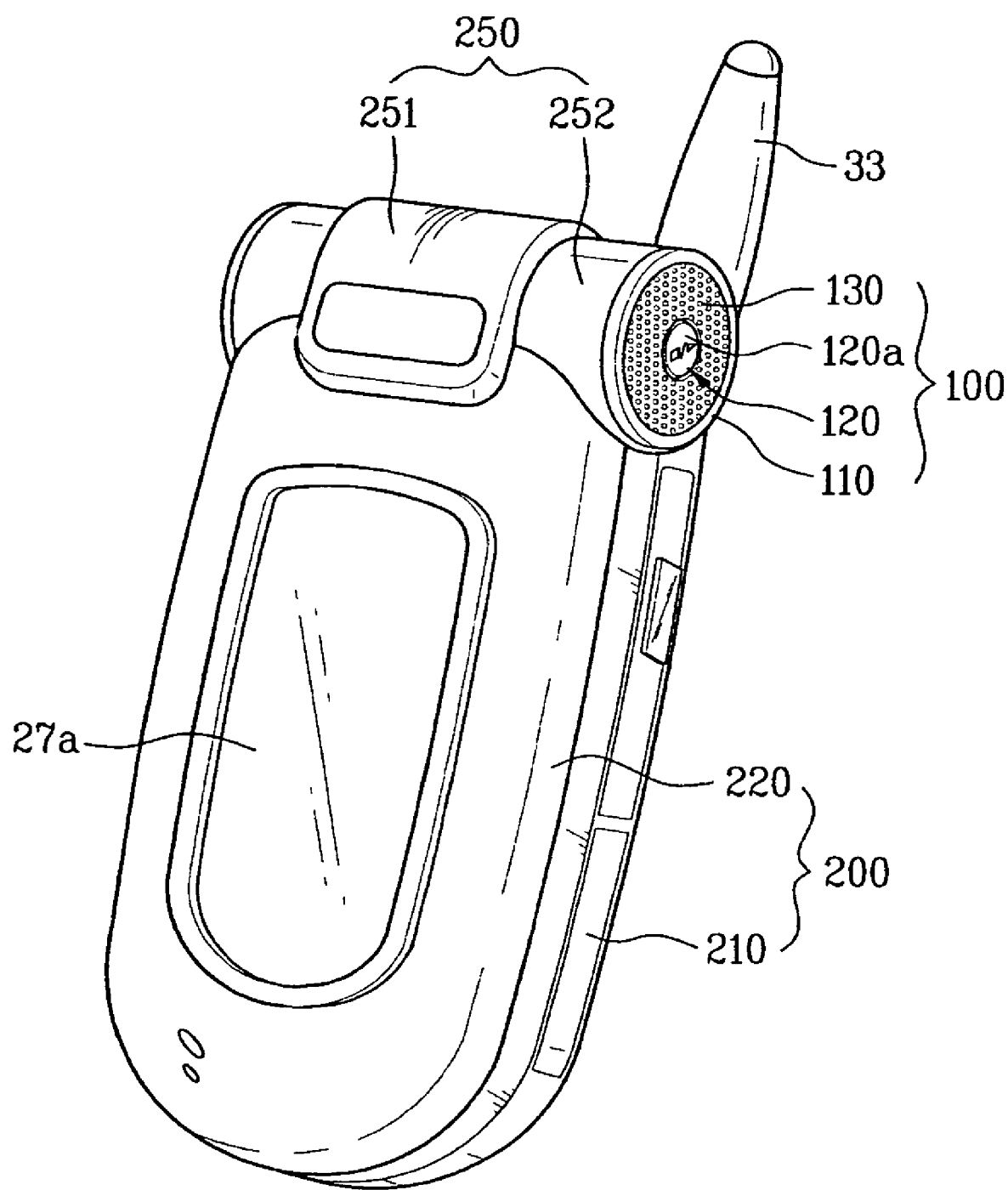
FIG. 3A and FIG. 3B are perspective diagrams of a mobile communication terminal according to a first embodiment of the present invention.
Figure 3B:
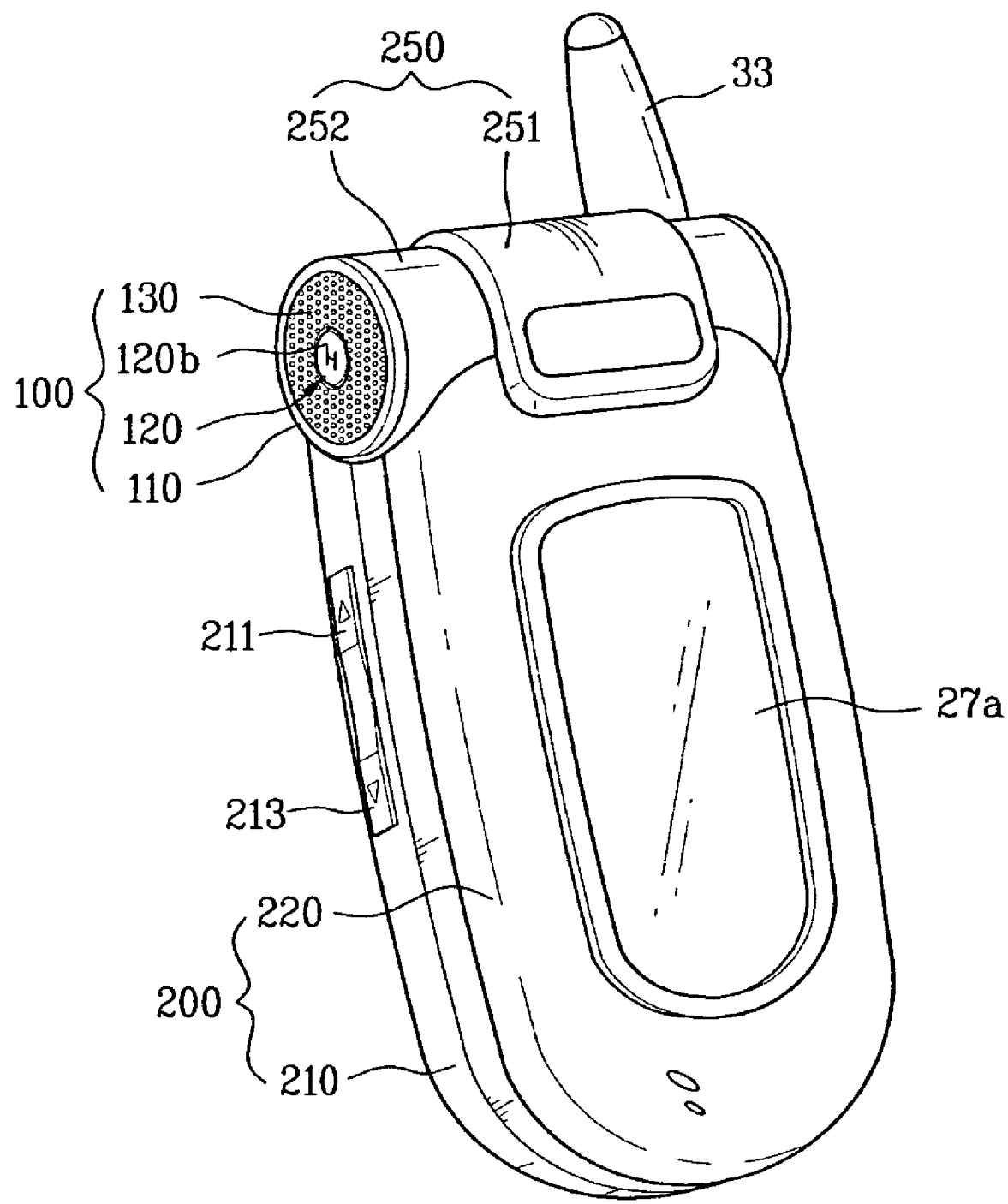

Referring first to FIG. 3A and FIG. 3B together, a control key assembly 100 for handling an audio player 40 is positioned on lateral sides of a housing 200. When positioned in this manner, a user can conveniently access and activate the individual keys on the control key assembly 100 using the thumb and the forefinger or the middle finger, while holding the housing 200 of the mobile communication terminal in one hand. In one preferred embodiment, the control key assembly 100 is positioned on an upper part of the lateral side of the housing in the manner shown. However, it will be appreciated that the exact positioning of the key assembly 100 might be varied so as to provide accessibility with different finger combinations and/or positions, depending on the particular needs addressed.

While not so limited, this particular configuration finds particular applicability in any kind of mobile communication terminal having a bar, flip or slide type housing.

In the example embodiment shown in FIGS. 3A to 4A, the mobile terminal includes a hinge mechanism 250, an upper housing 220 and a lower housing 210. The upper and lower housings 220 and 210 are rotatably joined together via the hinge mechanism 250.

As is shown in FIG. 4A, a keypad 21 and a microphone 23 are positioned on an inner surface of the lower housing 210. This inner surface abuts the upper housing 220 when the housing 200 is folded in a closed position (shown in FIGS. 3A and 3B). In the example embodiment, a battery (not shown in the drawing) is removably connected to an outer surface of the lower housing 210, i.e., a surface opposite to the keypad-provided surface.

FIG. 4A further illustrates how a display 27 and a speaker 25 are positioned on an inner surface of the upper housing 220, i.e., the surface that abuts the keypad 21 when the housing 200 is folded in a closed position. As is also shown in FIGS. 3A and 3B, an auxiliary display 27a can be positioned on an outer surface of the upper housing 220, i.e., a surface facing outward when the housing 200 is folded in a closed position. The auxiliary display 27a can, for example, be configured to display to a user information such as the current time, caller identification information, received message information, and the like, and does so without requiring the user to open the housing.

In the embodiment shown in FIGS. 3A through 4A, the hinge 250 includes a central portion 251 and a pair of end portions 252. The central portion 251 is configured so as to extend from a top end of the upper housing 220. The end portions 252 each extend from opposing sides of an upper end of the lower housing 210 so as to be separated by a predetermined distance. The central portion 251, as shown in FIG. 4A, is situated between the end portions 252 so as to join the upper and lower housings 220 and 210 together. It will be appreciated that this configuration is but one example of the manner in which the hinge 250 can be structured so as to rotatably connect the lower housing to the upper housing. For example, in an alternative configuration, the central portion 251 might instead extend from the lower housing 210, and the end portions 252 extend from the upper housing.

The hinge 250 is preferably arranged substantially parallel to the upper and lower housings 220 and 210. The control key assembly 100 is preferably positioned on opposing end faces on each of the end portions 252, as is shown in FIGS. 3A and 3B together. To accomplish this, a space for installing the control key assembly 100, as shown in FIG. 4A, is provided along an internal section of each of the end portions 252, as is described in further detail below.

The control key assembly 100, as shown in FIG. 4A, is installed within an internal space provided at each of the end portions 252 of the hinge 250. The control key assembly 100 includes a cap 110 and at least one control key 120 that can be activated by a user. A cap 110, as shown in FIG. 4A, is provided at each end portion 252 of the hinge 250. A control key 120, as shown in FIG. 3A and FIG. 3B, partially passes through the cap 110 to be exposed and thereby be accessible for actuation by a user. Hence, in the illustrated embodiment a user presses the exposed key 120 at the corresponding length-directional end of the hinge 250 to control or operate the audio player 40.

In the example embodiment, the key 120 includes a resilient or soft-keypad 121 disposed within the cap 110, and a button 125 provided between the keypad 121 and the cap 110. The keypad 121 can be formed of a flexible printed circuit board of the sort used in a convention keypad on a typical mobile communication terminal, thereby reducing the amount of space needed. The keypad 121 is electrically connected to a main circuit board 201 disposed within the lower housing 210.

In a preferred embodiment the button 125 is formed of a substantially rigid or hard material, such as plastic, metal and the like. One side of the button 125, as shown in FIG. 4A, partially passes through the cap 110 so as to be externally exposed on one end, and the other end in contact with the keypad 121. Hence, when a user presses the button 125, the button 125 engages and activates the keypad 121. Moreover, a stepped portion 125a, as shown in FIG. 4A, is provided to mechanically cooperate with the cap 110 so as to prevent the button 125 from escaping from the cap 110.

Figure 4B:
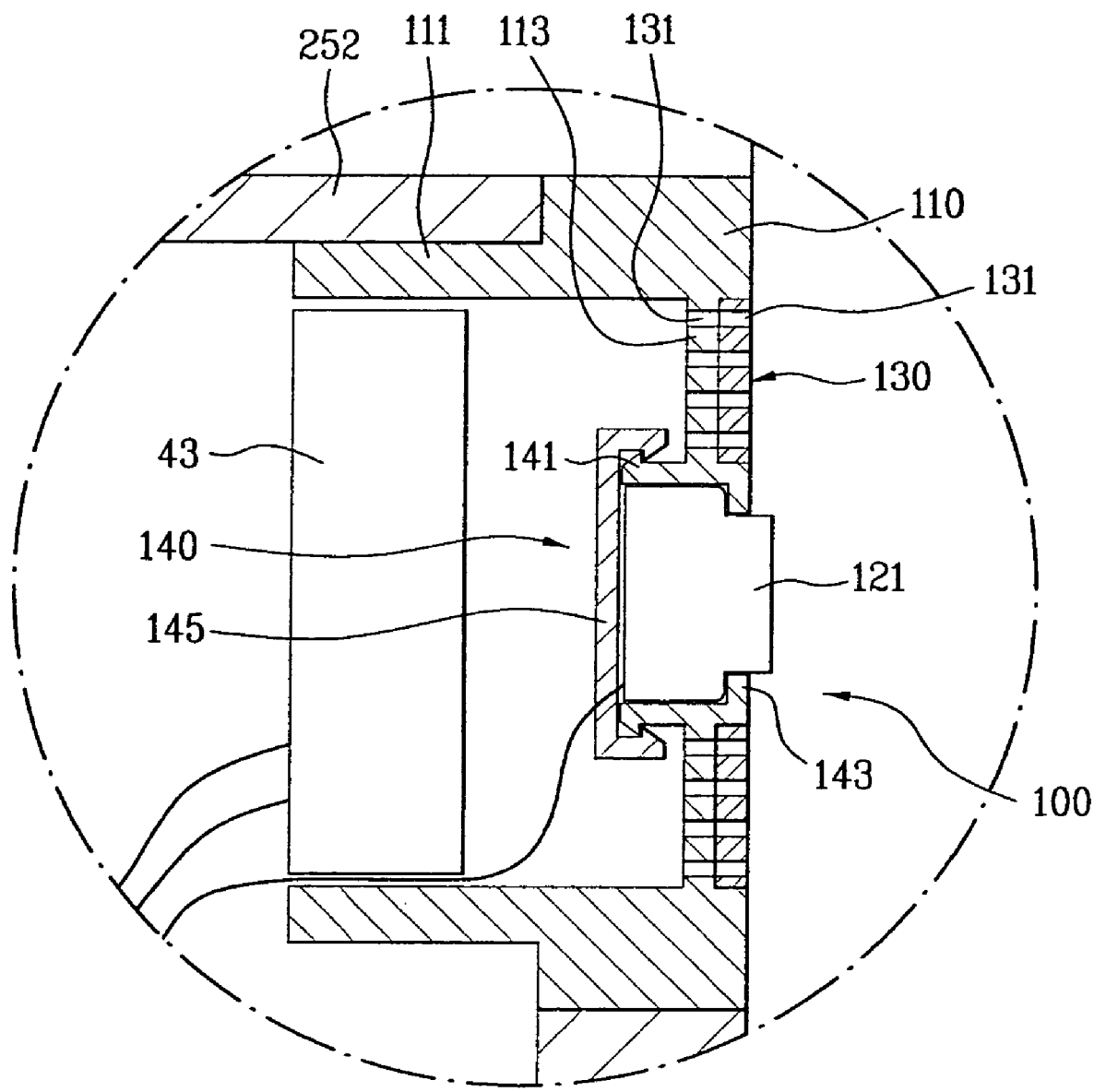
FIG. 4B is a cross-sectional diagram of a modification of the control key assembly in FIG. 4A.

The configuration of the key 120 is not limited to the above-explained structure. For instance, the key 120, as shown in FIG. 4B, may include only a keypad 121 formed from a soft or resilient material. In this case, one side of the keypad 121, as shown in FIG. 4B, partially passes through the cap 110 to be externally exposed.

In addition, the cap 110 is preferably configured to have a structure in which the key 120 can be secured. In the illustrated embodiment, the cap 110 includes a hollow frame 111 and a socket 140 provided within the frame 111. In this case, an open end portion of the frame 111 faces an inside of the hinge 250 so that the frame 111 is coupled with the end portion 252 of the hinge 250. And, the key 120 is loaded in the socket 140. The key 120, as shown in FIG. 4A, partially passes through the cap 110 to be externally exposed. The above-configured socket 140, as shown in FIG. 4A, is fixed to an inside of the frame 111 by a plurality of supports 113 protruding from an inner circumference of the frame 111. The socket 140 is arranged substantially at a center of the frame 111 to have the same central axis of the frame 111, for example.

The socket 140 secures the key 120 and preferably has a configuration facilitating the key 120 to be loaded therein. For this, the socket 140, as shown in FIG. 4A, may include several pieces. For instance, the socket 140 includes a cylinder 141 supported by the frame 111 and a cover 145 detachably assembled to one open end of the cylinder 141.

In this case, the cylinder 141 has a pair of open ends, and the key 120 is loaded in the cylinder 141. An extension 143, as shown in FIG. 4A, is positioned on a first end portion of the cylinder 141 that opens to the outside of the frame 111 to prevent the key 120 loaded in the cylinder from escaping from the cylinder 141. Since the extension 143 protrudes toward a central axis of the cylinder 141 from the first end portion, the key 120 loaded in the cylinder 141 is unable to escape externally via the first end portion. The cover 145 is assembled to and encloses a second end portion of the cylinder 141, which opens to the inside of the frame 111. Hence, the cover 145 is fitted to the second end portion of the cylinder 141 after the key 120 has been loaded in the cylinder 141 and is thereby able to secure the key 120 in the socket 140.

As is illustrated in FIG. 4A, in a preferred embodiment the mobile communication terminal further includes a speaker 43. The speaker 43 which can be used to output audio from the audio player 40, is positioned at the end portion 252 of the hinge 250 in a manner so as to be integrated with the control key assembly 100.

The speaker 43, as indicated by a solid line in FIG. 4A, can be loaded in the end portion 252 of the hinge 250, and more particularly, in the frame 111 of the cap 110 for example. In this case, at least one hole 131 is formed in the hinge 250, preferably in the region of the cap 110, as is denoted in FIG. 4A. In this case, the hole 131 is preferably formed at the length-directional end portion of the hinge 250. Alternatively, the hole 131 can be formed along a circumference of the hinge 250. In preferred embodiments, a plurality of holes 131 are formed in the in the vicinity of the key 120.

Figure 9:
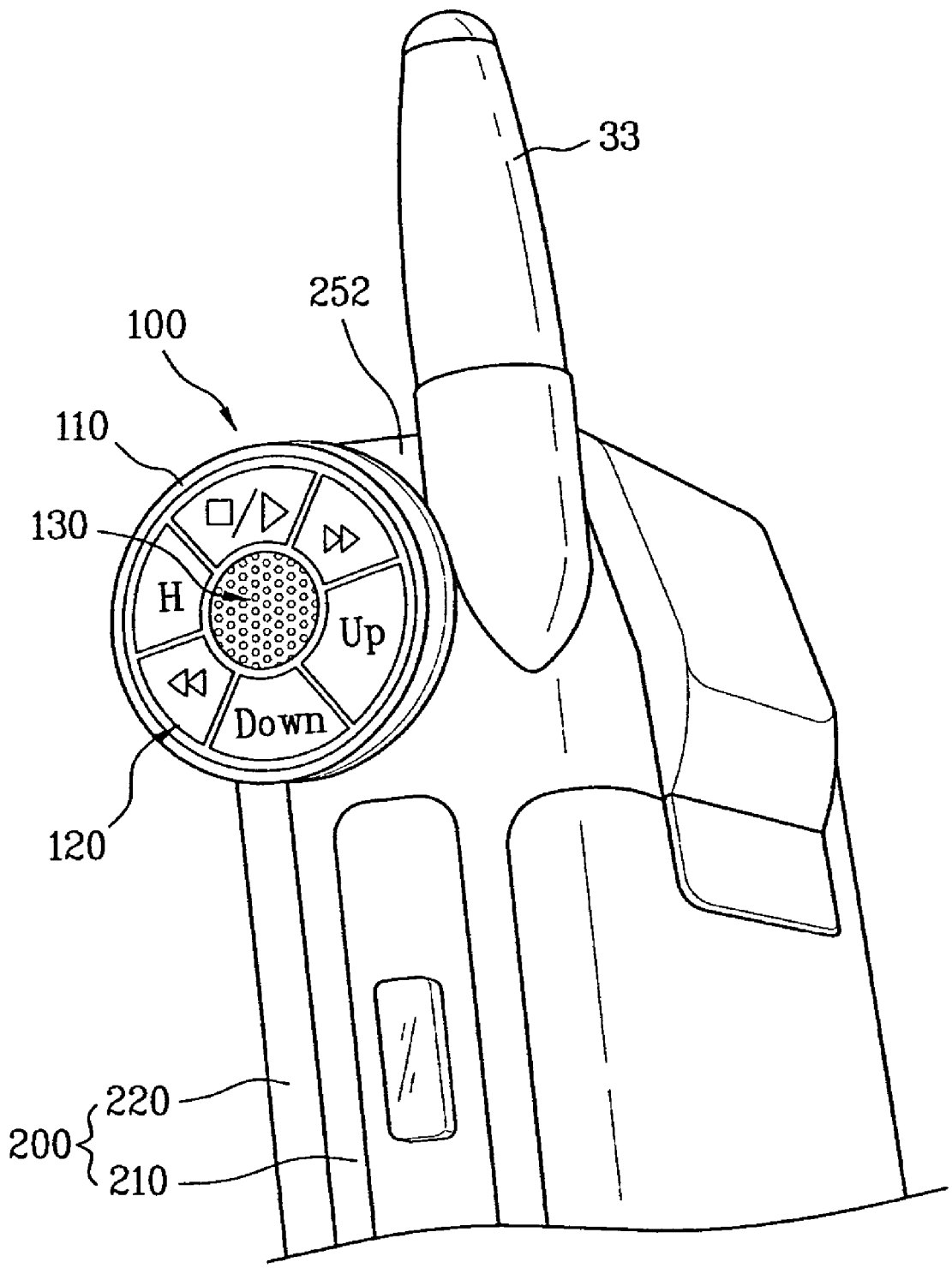
FIG. 9 is an exploded perspective diagram of another modification of a control key assembly of an audio player in the mobile communication terminal in FIG. 6.

Alternatively, the hole 131 can be provided in a different shape. For instance, a grill 130 having a plurality of holes 131 can be positioned at an area of the end portion of the cap 110 other than that which is occupied by the key 120. Specifically, the grill 130, as shown in FIGS. 3A to 4A, can be positioned on the end portion of the cap 110 to surround an exposed portion of the key 120. In other words, the key 120 is arranged substantially at a center of the cap 110 and the grill 130 is arranged to surround the key 120. Alternatively, the grill 130 can be arranged in a reverse manner. For instance, the grill 130, as shown in FIG. 9, is arranged substantially at the center of the end portion of the cap 110 and a plurality of keys 120 are arranged in the vicinity of the grill 130 to surround the grill 130.

The above-configured control key assembly 100, as shown in FIG. 3A and FIG. 3B, can be positioned on each of a pair of length-directional end portions 252 of the hinge 250. In this case, the control key assembly 100 includes function keys enabling convenient operations of the audio player 40, e.g., a stop/play key 120a and a hold key 120b, and is preferably provided together with the speaker 43 loaded in the hinge 250.

By way of example, the stop/play key 120a, as shown in FIG. 3A, is positioned on one of the two length-directional end portions 252 of the hinge 250 and the hold key 120b is positioned on the other. If the above-provided stop/play key 120a is pressed when the audio player 40 is not operating, the audio player 40 plays back a previously selected or stored music file. If the stop/play key 120a is pressed when the audio player 40 is operating, the played sound is stopped. If the hold key 120b is pressed, the operational state of the audio player 40 is not changed even though other control keys of the audio player 40 might be pressed. If the hold key 120b is pressed again after having been turned on, the hold mode is released, such that the operational state of the audio player 40 can be changed by other keys.

The use of the hold key 120b effectively prevents the operation of the audio player 40 of the mobile communication terminal from being interrupted or changed by an unexpected external force as the mobile communication terminal is carried by a user. However, the hold key 120b becomes operative if it is pressed. Hence, in these circumstances, the operational state of the audio player 40 could change if the hold key 120b and other control keys are sequentially pressed. The present invention provides a configuration that can prevent operational state from changing in this scenario.

Figure 5A:
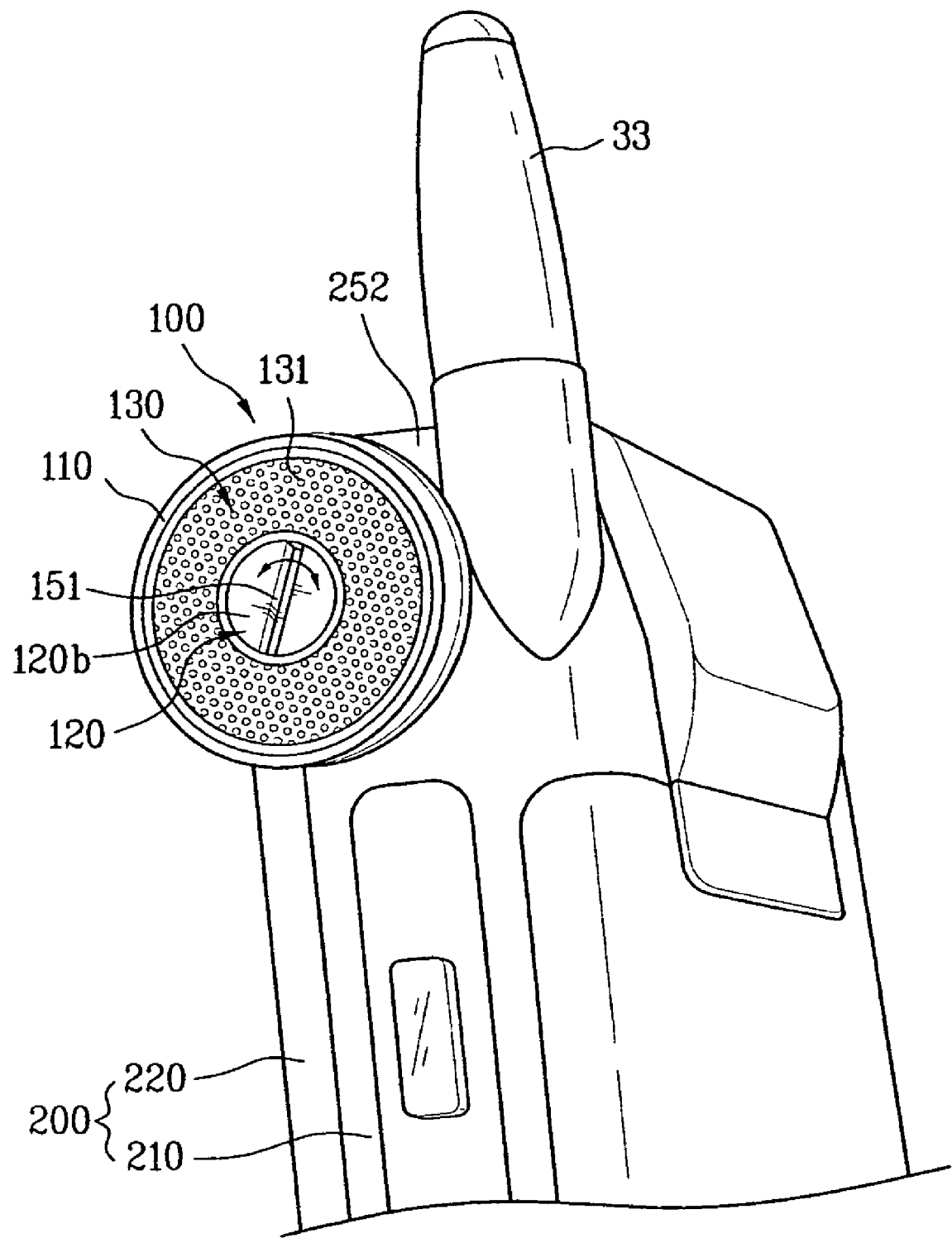
FIG. 5A and FIG. 5B are perspective diagrams of another example of a hold key of the mobile communication terminal in FIG. 3A and FIG. 3B.
Figure 5B:
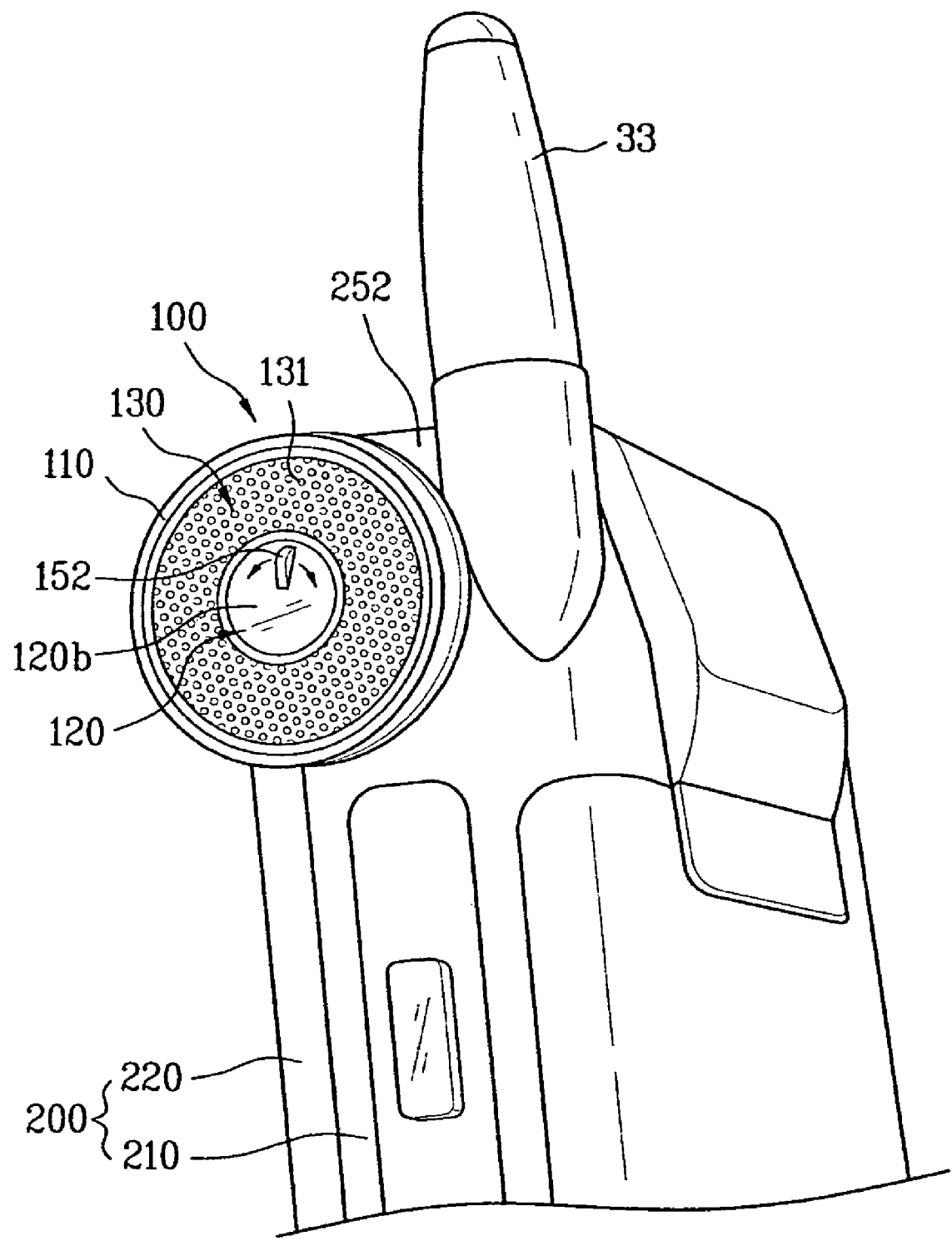

To prevent this situation from occurring, the hold key 120b, as shown in FIG. 5A and FIG. 5B, becomes operative by being rotated instead of being pressed. Specifically, the hold key 120b becomes operative by being rotated about an axis substantially parallel to the length-directional end portion of the hinge 250. This can be easily implemented by means of a switch (not shown in the drawing) in the socket 140 that is driven in rotating the hold key 120b.

Optionally, a groove 151 or a protrusion 152 can be positioned on a surface of the hold key 120b to facilitate the rotation thereof. The groove 151, as shown in FIG. 5A, is preferably formed along an upper surface of the hold key 120b in a radial direction. The protrusion 152, as shown in FIG. 5B, is preferably formed on the upper surface of the hold key 120b in a radial direction.

The example of the control key assembly 100 positioned on each of the two length-directional end portions 252 of the hinge 100 is explained in the above description. Alternatively, the control key assembly 100 can be positioned on only one of the two length-directional end portions 252 of the hinge 100. In this case, it is advantageous to provide a different part, such as a camera 50 or the like, on the other length-directional end portion 252 of the hinge 100.

If the control key assembly 100 is positioned on only one of the two length-directional end portions 252 of the hinge 100, the control key assembly 100 preferably includes several control keys 120. FIGS. 6 to 9 show a control key assembly according to a second embodiment of the present invention, in which several keys 120 are positioned on one control key assembly 100. A mobile communication terminal according to a second embodiment of the present invention is explained in detail with reference to FIGS. 6 to 9 as follows.

Figure 6:
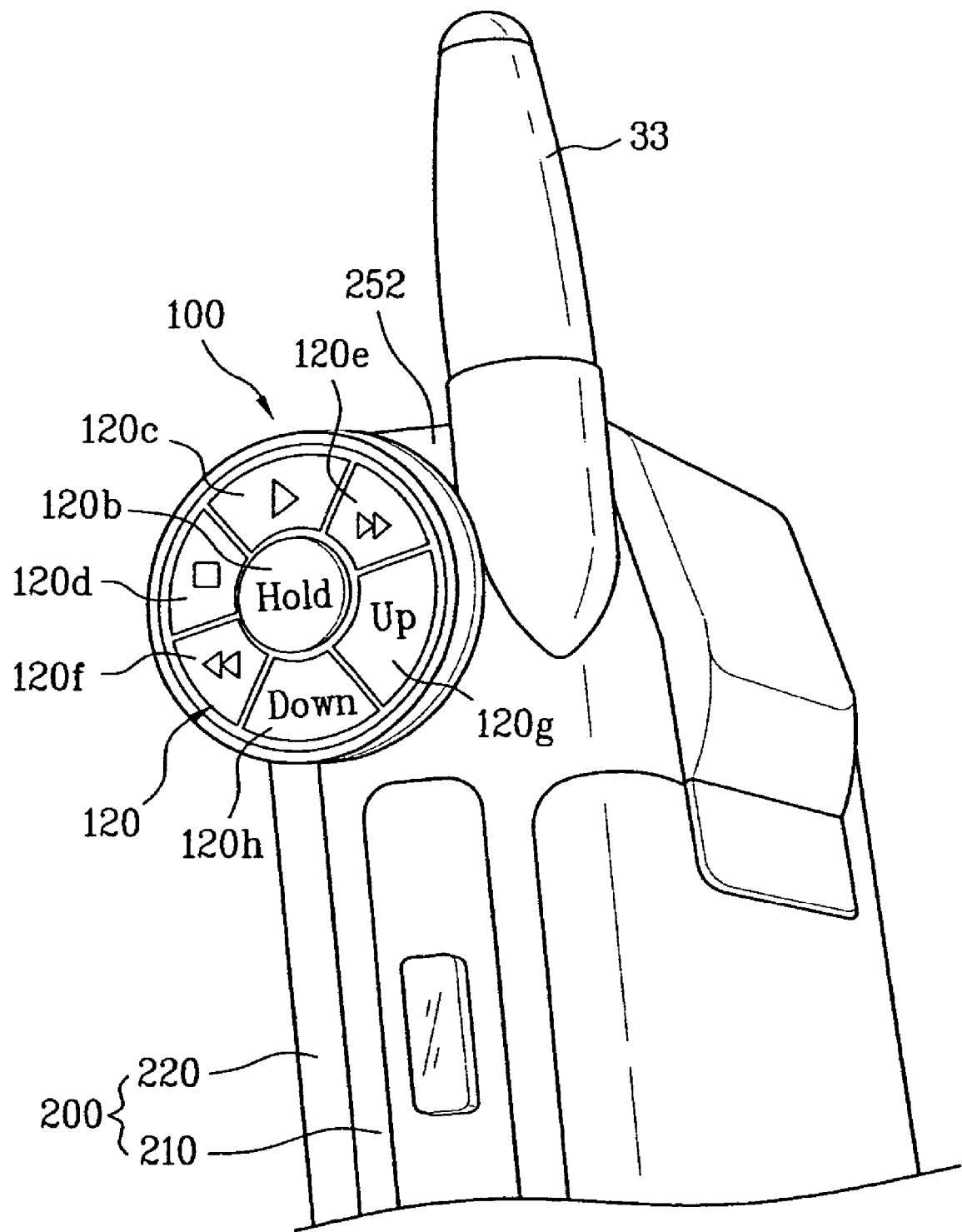
FIG. 6 is a perspective diagram of a mobile communication terminal according to a second embodiment of the present invention.

Referring to FIG. 6, several keys 120 are positioned on a control key assembly 100 according to a second embodiment of the present invention. The keys 120 of the control key assembly 100 occupy the majority of a lateral side of the end portion 252 of the hinge 250. The keys 120 may include, for example, a stop key 120d, a play key 120c, a forward key 120e, a backward key 120f, an up key 120g, a down key 120h and a hold key 120b. The number and types of the keys can be modified to provide the desired functions.

Figure 7:
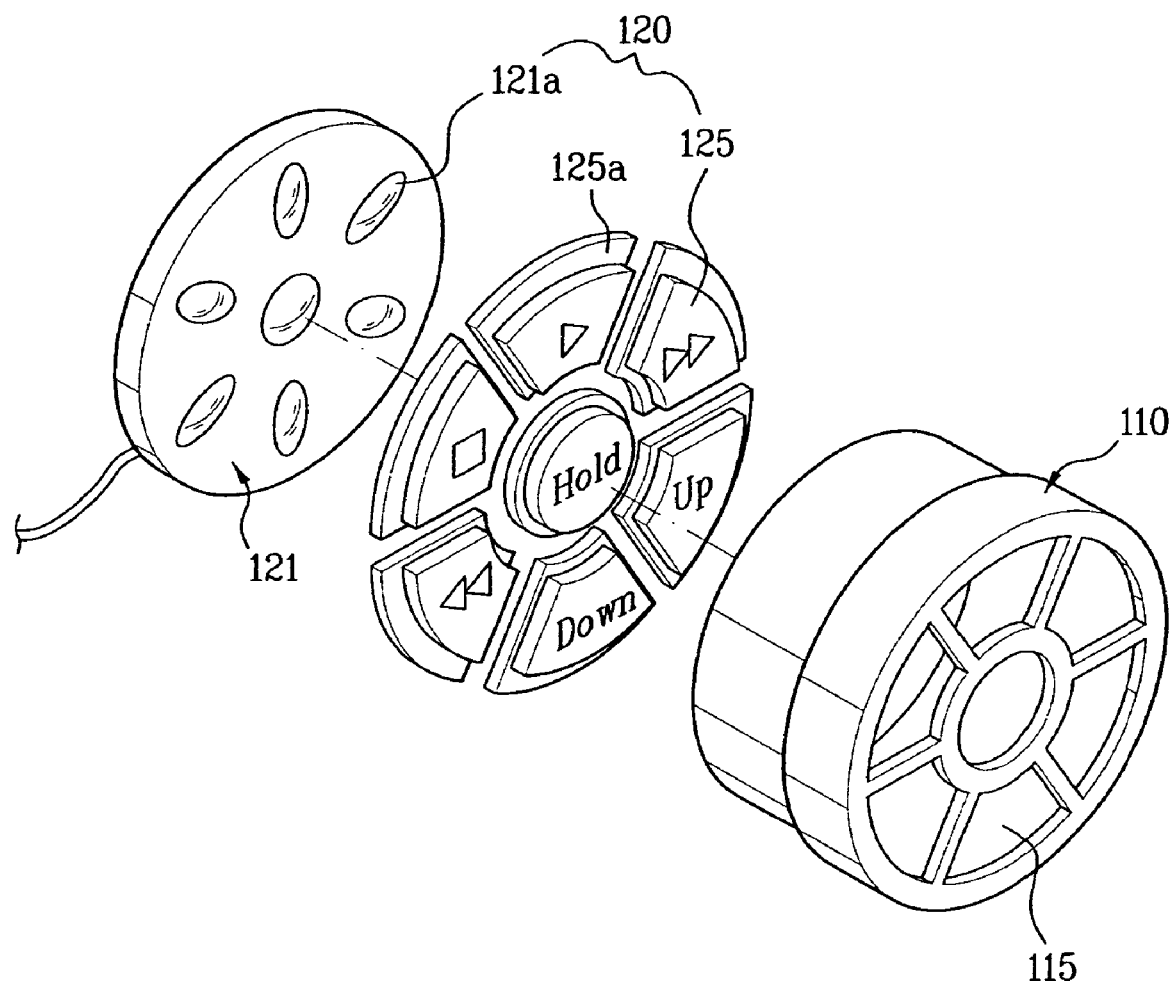
FIG. 7 is an exploded perspective diagram of a control key assembly of an audio player in the mobile communication terminal in FIG. 6.

A plurality of button holes 115, as shown in FIG. 7, are formed at one end of the cap 110 to enable a plurality of the keys to be loaded therein. Specifically, a button hole 115 corresponding to each of the keys 120 is formed in the end of the cap 110. And, a plurality of buttons 125 fitted in the button holes 115, respectively, and a keypad 121 are provided within the cap 110.

A stepped portion 125a is positioned on each of the buttons 125 to prevent the corresponding button 125 from escaping via the corresponding button hole 115. And, a plurality of switches 121a, each of which is pressed by the corresponding button 125 to operate the audio player 40, are positioned on areas of the keypad 121, as shown in FIG. 7, corresponding to the buttons 125, respectively. In the above-configured control key assembly 100, if one of the buttons 125 is pressed, the switch 121a of the keypad 121 brought into contact with the pressed button 125 is pressed to operate the audio player 40.

Figure 8:
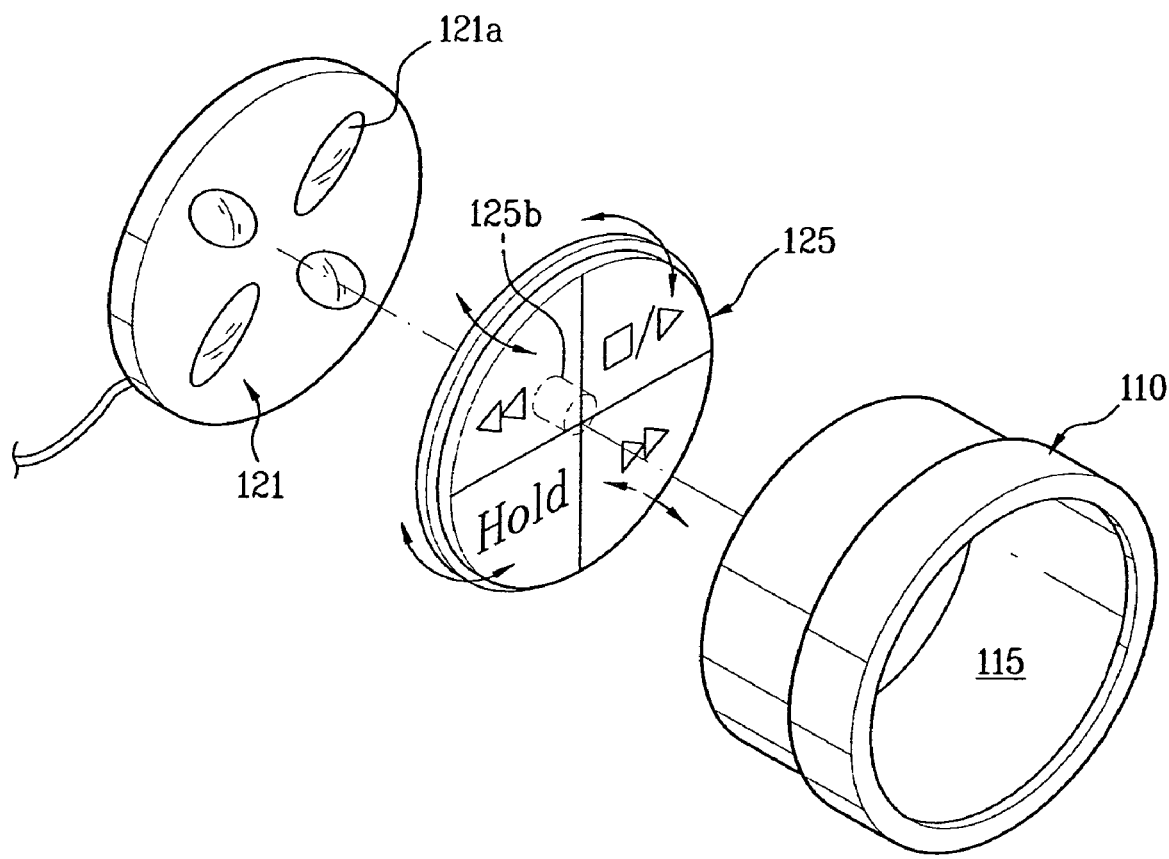
FIG. 8 is an exploded perspective diagram of a modification of a control key assembly of an audio player in the mobile communication terminal in FIG. 6.

The above description explains the example in which each of the keys 120 of the control key assembly 100 has one corresponding button 125 and one corresponding switch 121a. However, the control key assembly 100 according to the second embodiment of the present invention is not limited to the foregoing example, but can instead be implemented in another example. For instance, one button 125, as shown in FIG. 8, which can be obliquely pressed against a central axis, can selectively press various switches 121a positioned on the keypad 121.

To achieve this result, one large button hole 115 is positioned on an end portion of the cap 110 coupled with the end portion 252 of the hinge 250. The keypad 121 is located within the cap 110 and includes a plurality of the switches 121a for operating the audio player 40, which are arranged along an inner circumference of the cap 110. Moreover, one button 125 is provided between the button hole 115 and the keypad 121 to be obliquely pressed against the keypad 121. The button 125 is fitted in the button hole 115, and a support shaft 125b, as indicated by a dotted line in FIG. 8, protrudes from a center of the button 125. Hence, the button 125 is obliquely pressed against its center when a user presses a portion of the button 125 that is radially displaced from its center. Pressing the button 125 in this manner causes one of the switches 121a along the circumference of the keypad 121 to be pressed.

With the plurality of the keys 120 positioned on the control key assembly 100 in this manner, a user can use various functions of the audio player 40 more conveniently.

The control key assembly 100 according to the second-embodiment of the present invention, as shown in FIG. 9, can be assembled to the end portion 252 of the hinge 250 together with the speaker 43. Preferably, the grill 130 for transferring sound of the speaker 43 externally is arranged substantially at a center of the end portion of the hinge 250, and the keys 120 of the control key assembly 100 are arranged to surround the grill 130.

An example of operating the audio player 40 of the above-configured mobile communication terminal according to the present invention is explained as follows.

First, in case of attempting to listen to music using the audio player 40, a user presses the stop/play key 120a in FIG. 3A or the play key 120c in FIG. 6 while the housing 200 is folded. This results in the control unit 10 entering the mode for controlling the audio player 40, and an audio file list and a menu for controlling the audio player 40 are displayed on the auxiliary display 27a on the upper housing 220.

In this state, when using the mobile communication terminal of the embodiment shown in FIG. 3A and FIG. 3B, the user can search and select the audio file list and the menu using the up and down keys 211 and 213 and the stop/play key 120a in FIG. 3A.

For reference, the up and down keys 211 and 213, as shown in FIG. 3B, are similar to those that are positioned on the lateral side of the housing 200 of a conventional mobile communication terminal to raise or lower the volume. Hence, when the control key assembly 100 has only a small number of keys 120, such as those shown in FIG. 3A and FIG. 3B, the up and down keys 211 and 213 can be used in searching the file and menu in a control mode of the audio player 40.

In contrast, in the embodiment shown in FIG. 6, since all necessary keys (e.g., the forward key 120e, the backward key 120f, the up key 120g, the down key 120h, and the like) are provided in the control key assembly 100, a user can simply press the keys 120 of the control key assembly 100 to facilitate the file and menu search.

If the user presses the stop/play key 120a in FIG. 3A or the play key 120c in FIG. 6 after finding the audio file to be played back, sound is played by the file reproduction processing unit 41 and the speaker 43.

If the user desires to ensure that the playback of the audio player 40 will not be interrupted or that the operational state of the audio player 40 will not change while the sound is reproduced, the user can press the hold key 120b in FIG. 3B or FIG. 6. When the hold key 120b is pressed, the operational state of the audio player 40 will not change even if any other keys are pressed. On the other hand, if the user wants to intentionally stop the playback or change the operational state of the audio player 40, by pressing the hold key 120 once again to deactivate the hold function. The user can then stop the playback of the audio player 40 or change the operational state of the audio player 40 by pressing another key.

If the user wants to turn off the audio player 40, the playback of the sound is stopped if the user presses the stop/play key 120a in FIG. 3A or the stop key 120d in FIG. 6 while the sound is played back. If necessary, this involves searching the menu and selecting an audio player end item from the menu. Of course, if the stop key 120d is pressed once again after the playback of the sound has stopped, the audio player 40 is turned off.

Using the above-described mobile communication terminal according to the present invention, a user can use the audio player very conveniently without unfolding the mobile communication terminal.

According to the present invention, positioning the keys for operating the audio player on the lateral sides of the housing, e.g., both of the lateral end portions of the hinge joining the upper and lower housings together, assists the user in pressing the keys using the thumb, forefinger, middle finger and third finger. It is also possible to design a wider auxiliary display on the upper surface of the housing, e.g., the outer surface of the upper housing, than would otherwise be possible if the keys for operating the audio player were positioned on the outer surface of the upper housing.

Moreover, since the speakers providing sound are built in both of the lateral end portions of the hinge together with the keys for operating the audio player, the present invention efficiently utilizes the space to enable a compact size of the housing.

In the mobile communication terminal according to an embodiment of the present invention, the hold key is positioned on the control key assembly for operating the audio player and operates by being rotated. Hence, this embodiment of the present invention effectively prevents the operational state of the audio player from being easily changed by other keys that might be pressed by an unexpected external force when the terminal is being carried.

If the control key assembly is positioned on one of the end portions of the hinge, a camera lens can be positioned on the other end portion to efficiently use space. Moreover, positioning a plurality of keys on the control key assembly permits a user to conveniently use various functions of the audio player.

The foregoing discussion has been directed to example embodiments of a mobile communications device having an improved configuration of control keys integrated within the hinge assembly of the mobile device. It will be appreciated that while the control keys have been described in connection with the control and operation of an integrated audio player, that they should not be viewed as being limited to that specific use. In fact, the control key configuration would find applicability in connection with the operation and control of any functional component of the mobile communication device, including other audio and/or video functions.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A mobile communication terminal comprising:
   a first housing accommodating components enabling wireless communication with an external device, wherein the first housing comprises a first side and an opposing second side;
   at least a first speaker for reproducing voice communications received via the wireless communication, wherein the first speaker is located on the first side of the first housing;
   a first display located on the first side of the first housing, the first display being configured to display information relating to the wireless communication;
   a memory for storing audio files;
   an audio player disposed in the first housing;
   at least one second speaker for reproducing at least an audio signal from the audio player, wherein the second speaker is physically integrated with the terminal; and
   an audio player control assembly comprising a first key configured to control both a play function and another function of the audio player, wherein the audio player control assembly is disposed on a lateral side of the first housing.

2. The terminal of claim 1, wherein the at least one second speaker is disposed at least partially within the first housing.

3. The terminal of claim 2, wherein the terminal is in one of a first or a second operating position, wherein the first operating position is for conducting a wireless voice call.

4. The terminal of claim 3, wherein the audio player is operable when the terminal is in one of the first or the second operating positions.

5. The terminal of claim 2 further comprising a video player.

6. The terminal of claim 5, wherein the at least one second speaker reproduces an audio signal from the video player.

7. The terminal of claim 5, wherein the audio player control assembly further controls a play function and a stop function of the video player.

8. A mobile communication terminal comprising:
   an upper housing and a lower housing accommodating components enabling wireless communication with an external device, wherein the upper housing comprises a first side and an opposing second side;
   at least a first speaker for reproducing voice communications received via the wireless communication, wherein the first speaker is located on the first side of the upper housing;
   a first display located on the first side of the upper housing, the first display being configured to display information relating to the wireless communication;
   a memory for storing audio files;
   an audio player disposed in at least one of the upper housing or the lower housing;
   at least one second speaker for reproducing at least an audio signal from the audio player, wherein the second speaker is physically integrated with the terminal; and
   an audio player control assembly comprising a first key configured to control a play function and a stop function of the audio player, wherein the audio player control assembly is disposed on a lateral side of the upper housing.

9. The terminal of claim 8, wherein the terminal is in one of a first or a second operating position, wherein the first operating position is for conducting a wireless voice call.

10. The terminal of claim 9, wherein the audio player is operable when the terminal is in one of the first or the second operating positions.

11. The terminal of claim 8, further comprising a video player.

12. The terminal of claim 11, wherein the at least one second speaker reproduces an audio signal from the video player.

13. The terminal of claim 11, wherein the audio player control assembly further controls a play function and a stop function of the video player.

14. The terminal of claim 8, further comprising an auxiliary display disposed on the upper housing, wherein a menu for controlling the audio player and an audio file list are displayed on the auxiliary display.

15. The terminal of claim 14, wherein an audio file is selected from the audio file list using at least one of an up key or a down key.

16. The terminal of claim 1, further comprising:
a second display located on the second side of the first housing, the second display being configured to display an audio file list identifying the stored audio files.

17. The terminal of claim 16, wherein the audio player control assembly further comprises:
a second key configured to permit rewinding of a currently played audio file of the stored audio files;
a third key configured to permit forwarding of the currently played audio file;
a fourth key configured to forward scroll the audio file list to a next audio file of the stored audio files; and
a fifth key configured to reverse scroll the audio file list to a previous audio file of the stored audio files.

18. The terminal of claim 17, wherein the terminal is a folder-type terminal having an open position and a closed position, wherein the audio player control assembly enters a mode for controlling the audio player responsive to user input to the first key, and wherein the another function of the first key is a stop function which ceases audio reproduction of the currently played audio file of the stored audio files.

19. The terminal of claim 17, wherein the terminal is a folder-type terminal having an open position and a closed position, wherein the audio player control assembly functions while the terminal is in the closed position.

20. The terminal of claim 1, wherein the second speaker is located in a hinge housing coupled to the first housing.

21. The terminal of claim 8, further comprising:
a second display located on the second side of the upper housing, the second display being configured to display an audio file list identifying the stored audio files.

22. The terminal of claim 21, wherein the audio player control assembly further comprises:
a second key configured to permit rewinding of a currently played audio file of the stored audio files;
a third key configured to permit forwarding of the currently played audio file;
a fourth key configured to forward scroll the audio file list to a next audio file of the stored audio files; and
a fifth key configured to reverse scroll the audio file list to a previous audio file of the stored audio files.

23. The terminal of claim 22, wherein the terminal is a folder-type terminal having an open position and a closed position, wherein the audio player control assembly enters a mode for controlling the audio player responsive to user input to the first key, and wherein the stop function functions to cease audio reproduction of the currently played audio file of the stored audio files.

24. The terminal of claim 22, wherein the terminal is a folder-type terminal having an open position and a closed position, wherein the audio player control assembly functions while the terminal is in the closed position.

25. The terminal of claim 8, wherein the second speaker is located in a hinge housing coupled to the upper housing.

26. A mobile communication terminal, comprising:
a first housing accommodating components enabling wireless communication with an external device, wherein the first housing comprises a first side and an opposing second side;
a second housing rotatably coupled to the first housing, wherein the second housing comprises a first side and an opposing second side, wherein the first housing is positionable relative to the second housing between open and closed positions, and wherein the first side of the first housing faces the first side of the second housing while in the closed position;
a first speaker for reproducing voice communications received via the wireless communication, wherein the first speaker is located on the first side of the first housing;
a memory for storing audio files;
an audio player located in at least one of the first housing or the second housing;
a second speaker for reproducing at least an audio signal from the audio player, wherein the second speaker is physically integrated with the terminal;
a first display located on the first side of the first housing, the first display being configured to display information relating to the wireless communication;
a second display located on the second side of the first housing, the second display being configured to display an audio file list identifying the stored audio files; and
an audio player control assembly comprising a first key configured to control both a play function and another function of the audio player, wherein the audio player control assembly is disposed on a lateral side of the first housing, and wherein the audio player control assembly functions while the terminal is in the closed position.

27. The terminal of claim 26, wherein the audio player control assembly further comprises:
a second key configured to permit rewinding of a currently played audio file of the stored audio files;
a third key configured to permit forwarding of the currently played audio file;
a fourth key configured to forward scroll the audio file list to a next audio file of the stored audio files; and
a fifth key configured to reverse scroll the audio file list to a previous audio file of the stored audio files.

28. The terminal of claim 27, wherein the audio player control assembly enters a mode for controlling the audio player responsive to user input to the first key, and wherein the another function of the first key is a stop function which ceases audio reproduction of the currently played audio file of the stored audio files.

* * * * *